United States Patent [19]
Ezaki

[11] Patent Number: 5,589,886
[45] Date of Patent: Dec. 31, 1996

[54] MULTISTANDARD DECODER FOR DATA STORED IN THE VERTICAL BLANKING INTERVAL OF A VIDEO SIGNAL

[75] Inventor: Tadashi Ezaki, Tokyo, Japan

[73] Assignee: Sony Corporation

[21] Appl. No.: 434,062

[22] Filed: May 3, 1995

Related U.S. Application Data

[62] Division of Ser. No. 130,469, Oct. 1, 1993, Pat. No. 5,453,794.

[30] Foreign Application Priority Data

Oct. 8, 1992  [JP]  Japan ................................. 4-293982

[51] Int. Cl.$^6$ ................................................. H04H 7/087
[52] U.S. Cl. ........................ 348/461; 348/466; 348/468; 348/473
[58] Field of Search .................................. 348/461, 465, 348/467, 468, 473, 474, 476, 478

[56] References Cited

U.S. PATENT DOCUMENTS

| | | |
|---|---|---|
| 4,199,656 | 4/1980 | Saylor . |
| 4,202,012 | 5/1980 | Hirashima . |
| 4,841,365 | 6/1989 | Guenot et al. . |
| 5,045,941 | 9/1991 | Davies . |
| 5,343,300 | 8/1994 | Hennig . |

FOREIGN PATENT DOCUMENTS

| | | |
|---|---|---|
| 0567168 | 10/1993 | European Pat. Off. . |
| 2006570 | 5/1979 | United Kingdom . |

OTHER PUBLICATIONS

IEEE Transactions on Consumer Electronics vol. 38, No. 3, Aug. 1992, New York US pp. 288–295 Shirley James 'New Devices for VCR Control Using Teletext Services'.

IEEE 1992 International Conference on Consumer Electronics ICCE 2–4 Jun. 1992 Rosemont (US) pp. 132–133 Stellar et al. 'Single Chip Solution For Higher Level World System Teletext'.

IEEE Transactions on Consumer Electronics vol. 38, No. 3, Aug. 1992, New York US pp. 279–284 Manfred Junke 'A Multistandard Teletext Processor'.

IEEE Transactions on Consumer Electronics vol. 38, No. 3, Aug. 1992, New York US pp. 268–272 Hiroyasu Shindo et al. 'Microcontolers For Closed Caption System' p. 268, left column, line 1–p. 270, right column, line 13.

*Primary Examiner*—Victor R. Kostak
*Assistant Examiner*—Nathan J. Flynn
*Attorney, Agent, or Firm*—William S. Frommer; Alvin Sinderbrand

[57] ABSTRACT

A data decoding device capable of decoding plural kinds of data superimposed in a vertical blanking period of a video signal. The device comprises means for detecting the line number and the intraline position in the vertical blanking period from vertical and horizontal sync signals and generating a line signal extract pulse, a data signal extract pulse and a reference signal extract pulse; binary circuit means for converting the video signal into a binary signal; PLL means for producing a data extract clock signal in synchronism with a clock reference signal extracted on the basis of the line signal extract pulse and the reference signal extract pulse; memory means supplied with the data extract clock signal and the binary signal in response to the line signal extract pulse and the data signal extract pulse, and storing the data signal therein; and control means capable of designating a plurality of durations for generating the respective extract pulses and a plurality of frequency division ratios in the PLL means. In the device, the circuits are usable in common to achieve curtailment in the production cost.

7 Claims, 12 Drawing Sheets

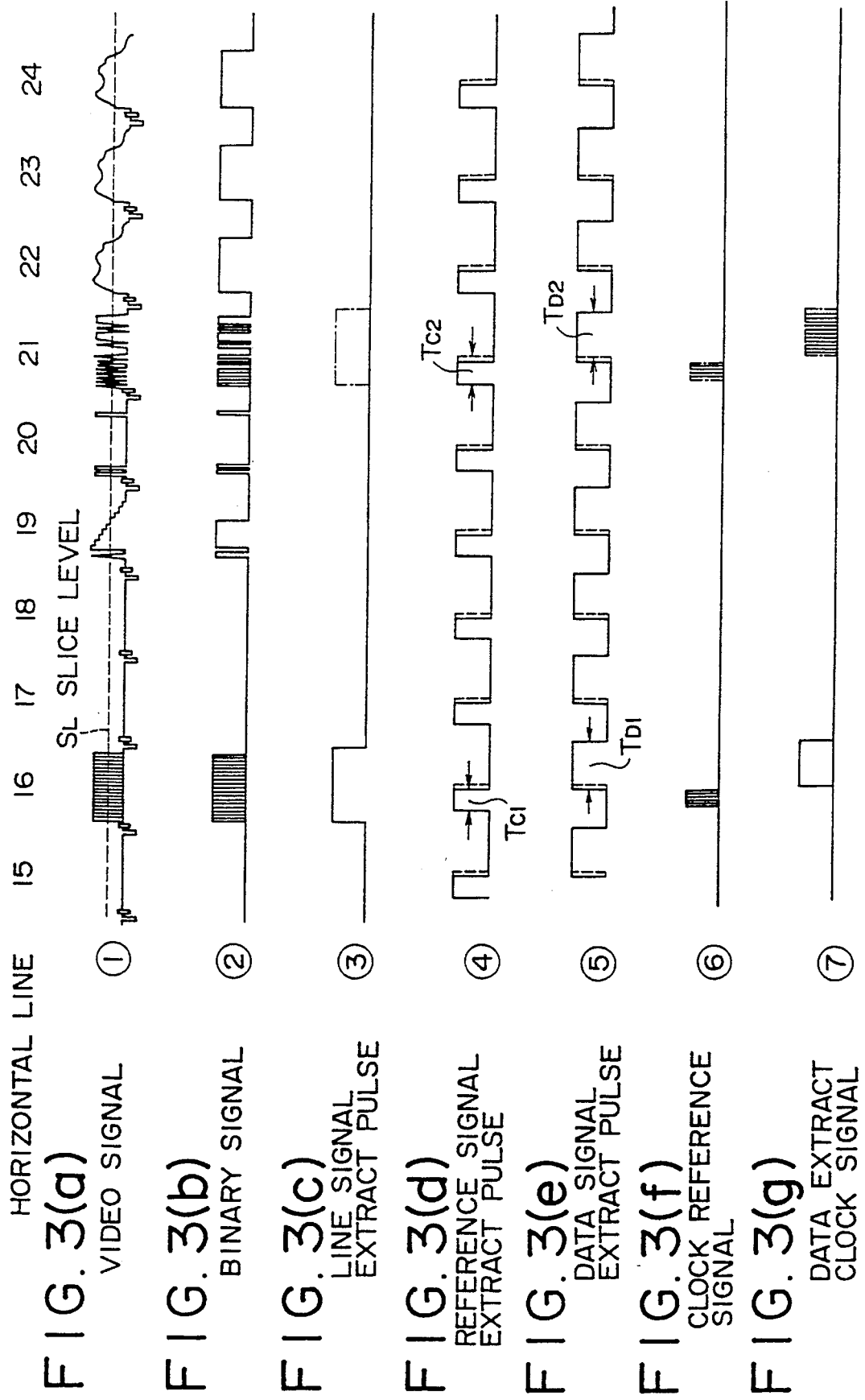

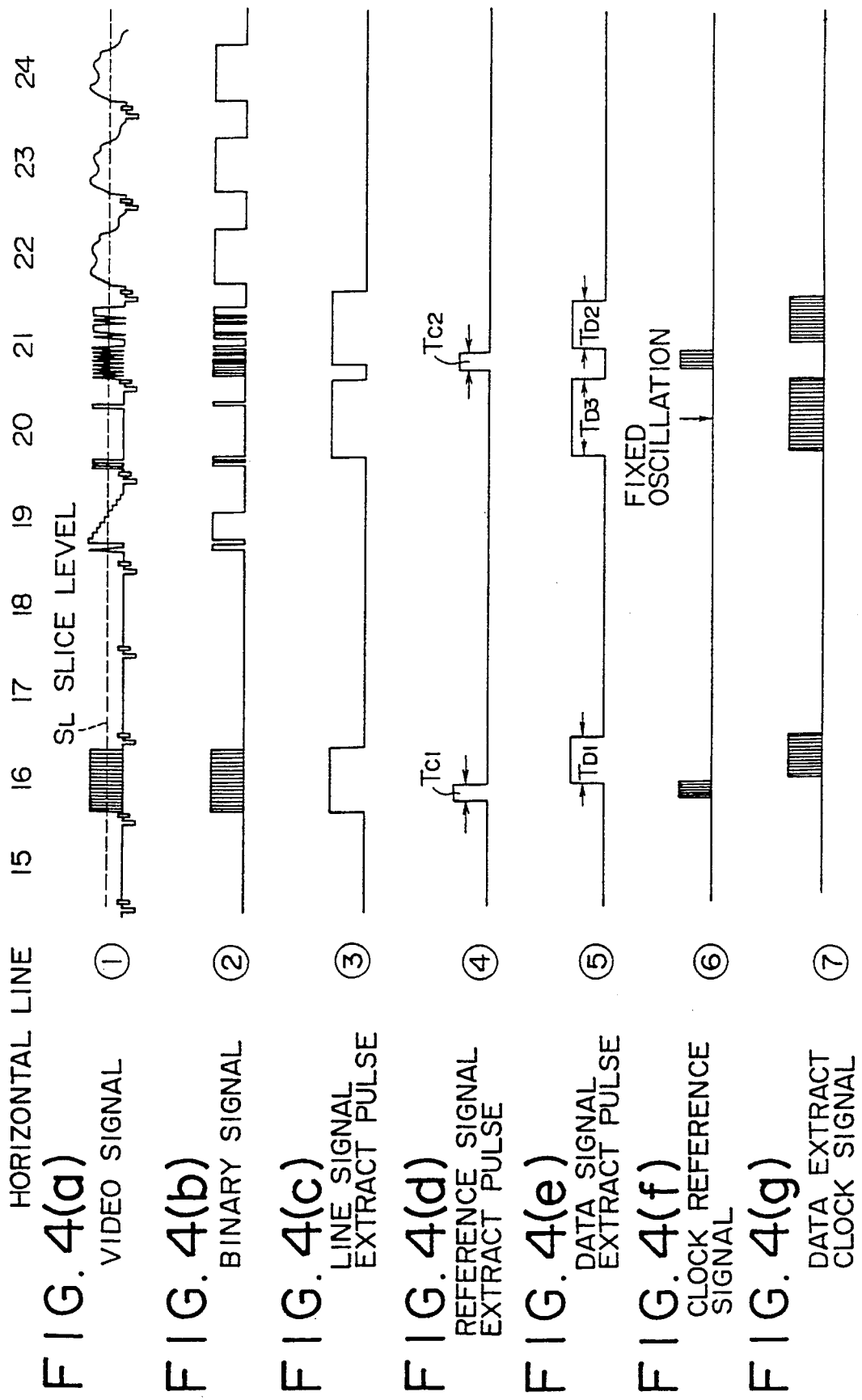

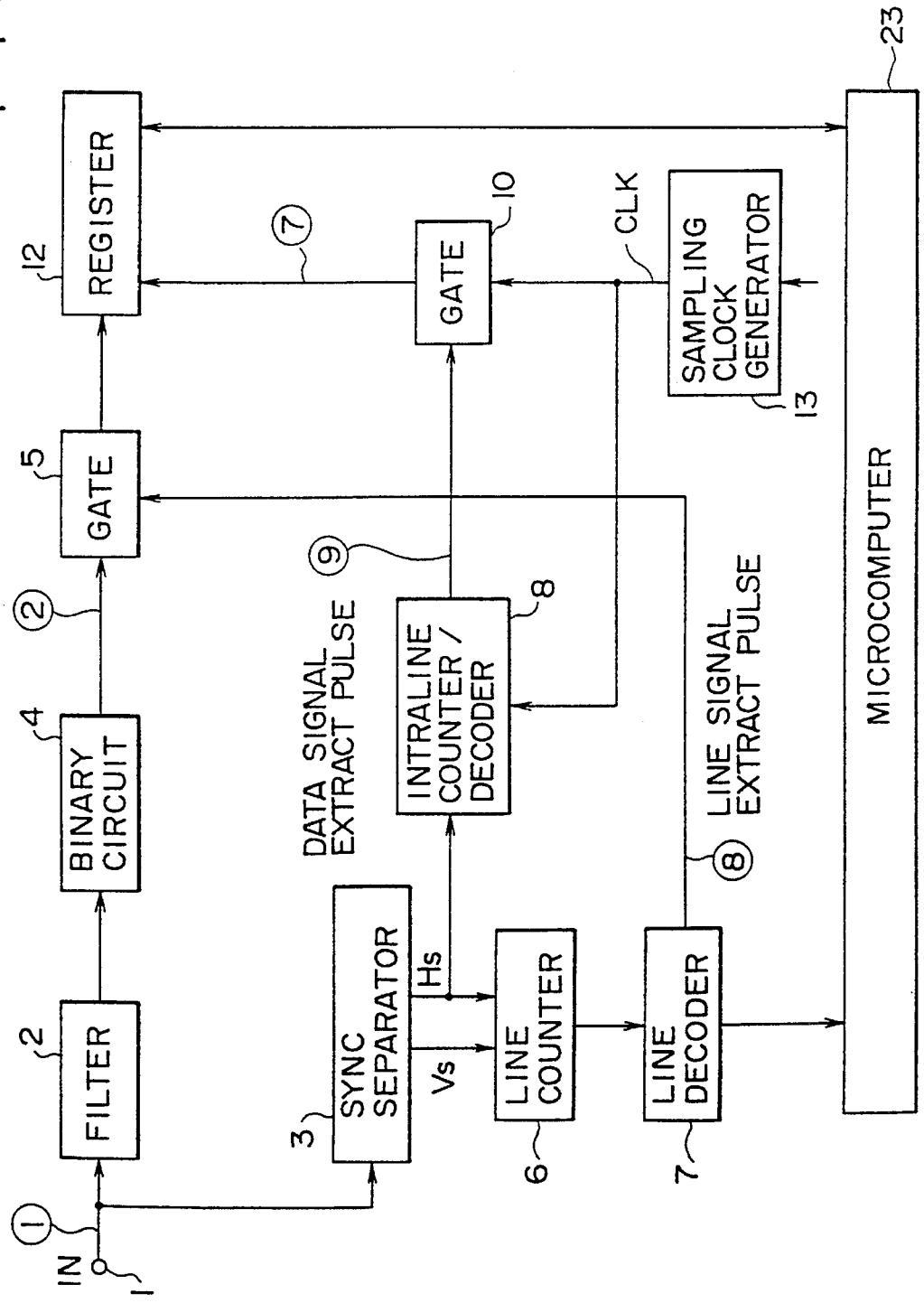

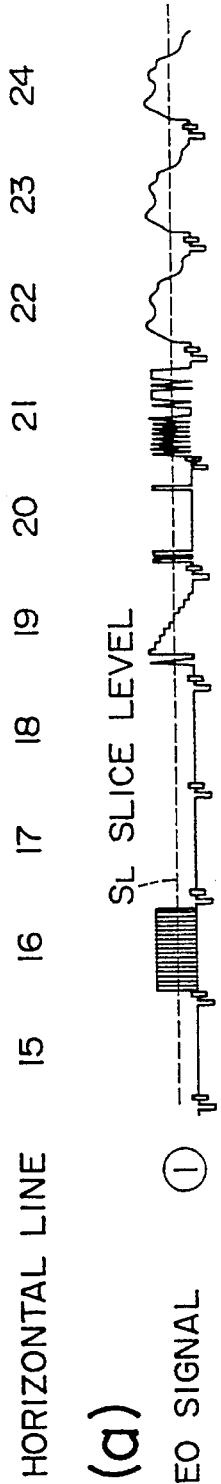
FIG. 6(a) VIDEO SIGNAL ①
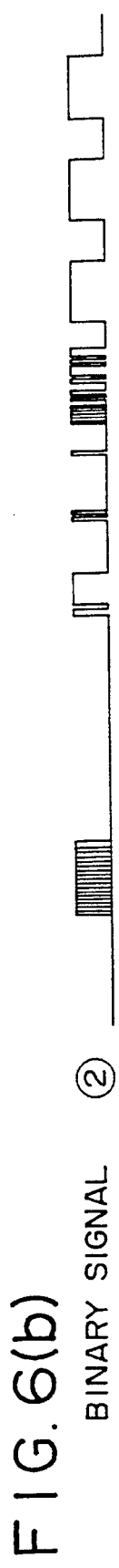
FIG. 6(b) BINARY SIGNAL ②
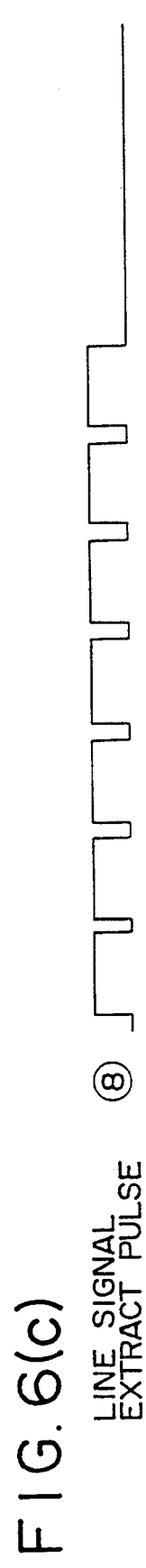
FIG. 6(c) LINE SIGNAL EXTRACT PULSE ⑧
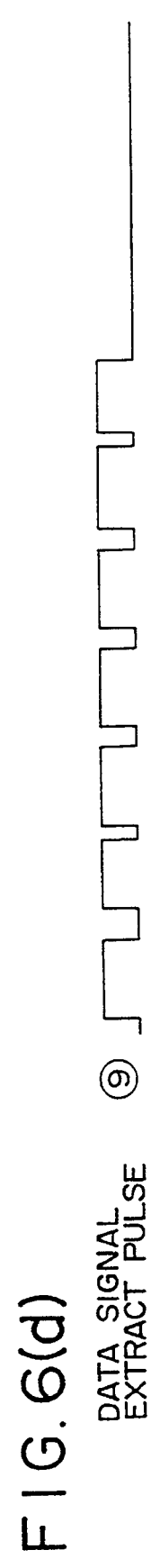
FIG. 6(d) DATA SIGNAL EXTRACT PULSE ⑨
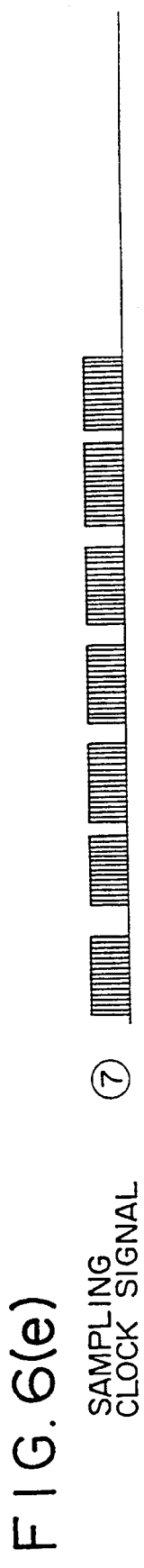
FIG. 6(e) SAMPLING CLOCK SIGNAL ⑦

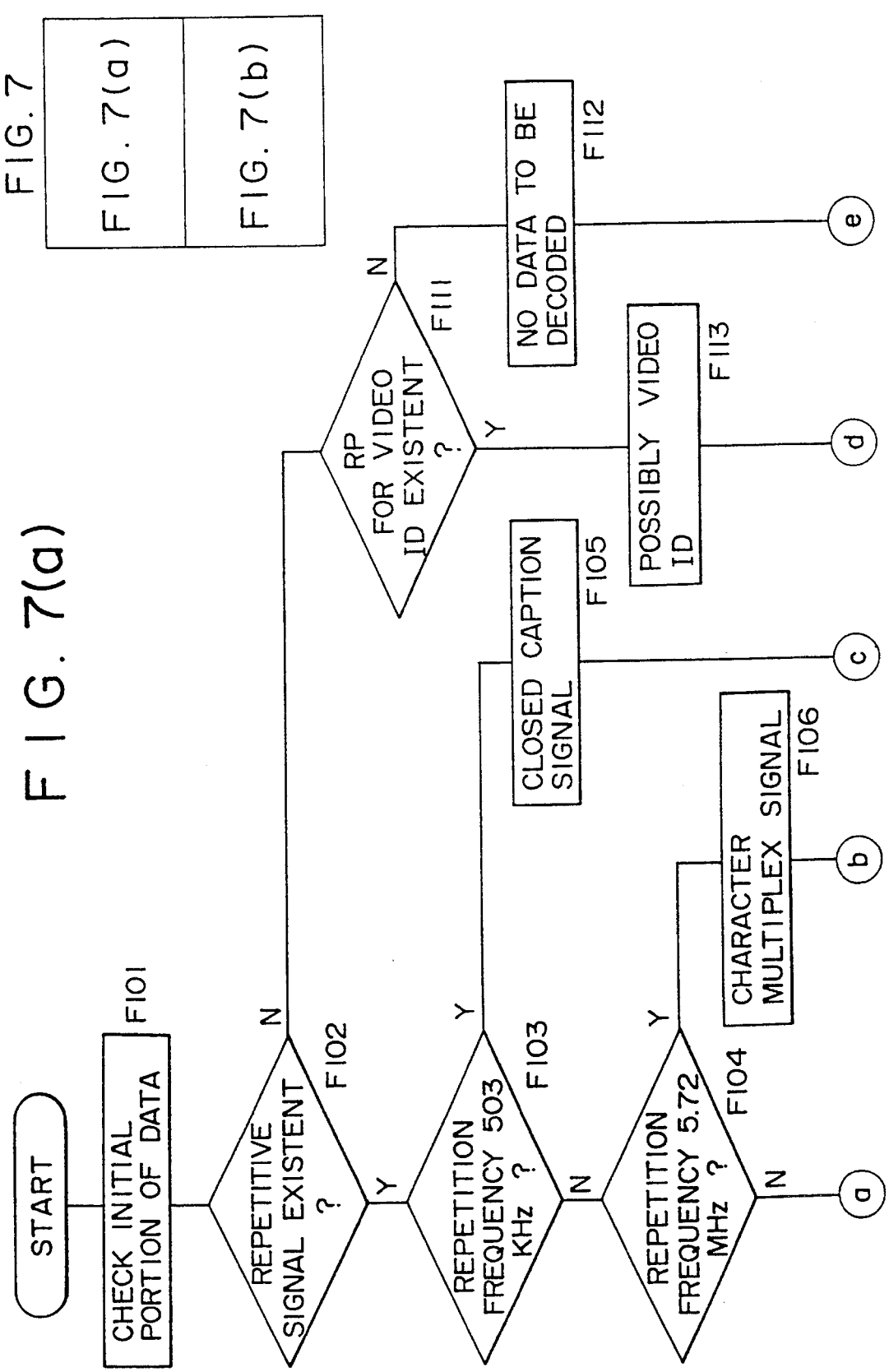

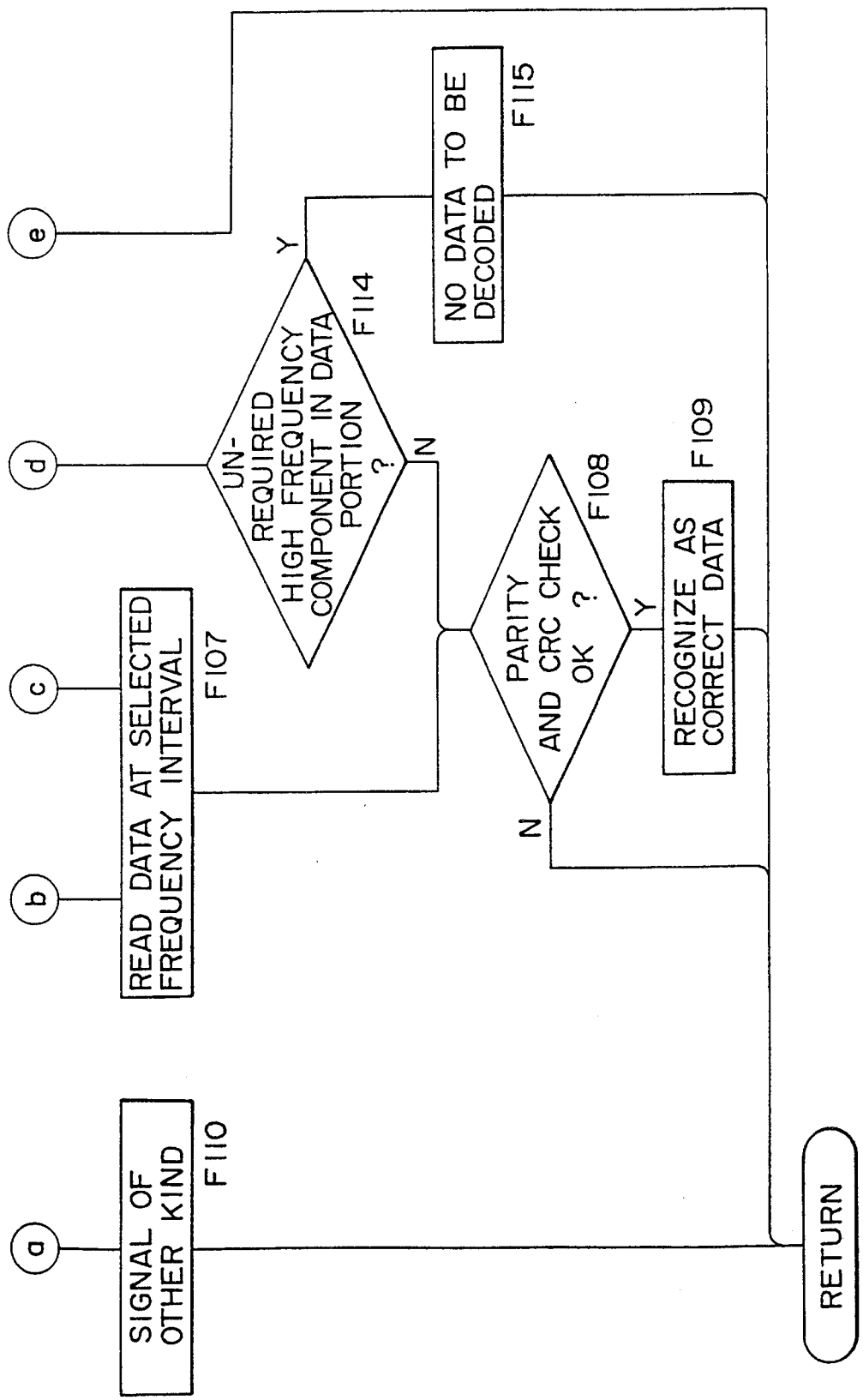

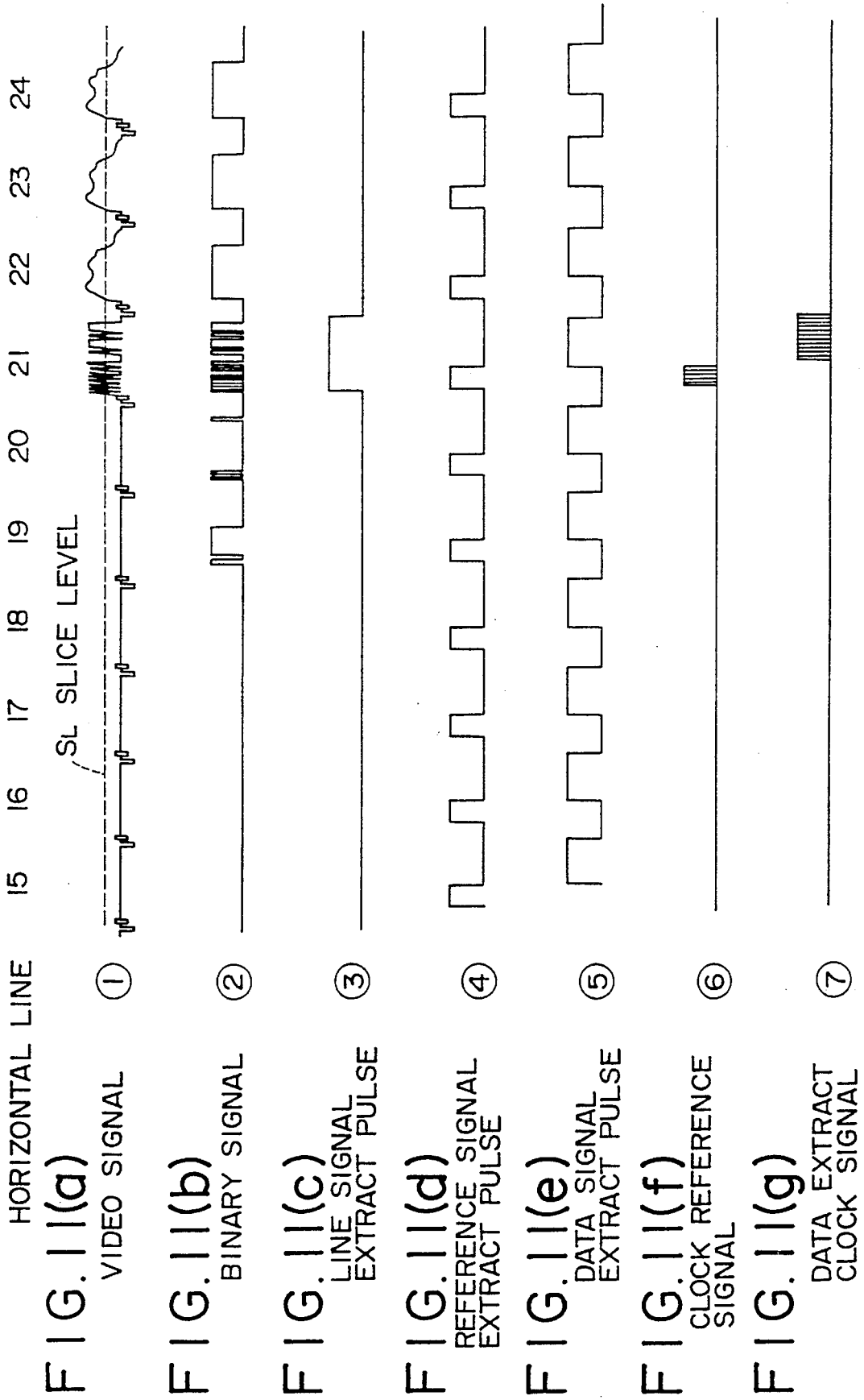

MULTISTANDARD DECODER FOR DATA STORED IN THE VERTICAL BLANKING INTERVAL OF A VIDEO SIGNAL

This application is a division of application Ser. No. 08/130,469, filed Oct. 1, 1993 now U.S. Pat. No. 5,453,794.

BACKGROUND OF THE INVENTION

1. Field of the Invention

The present invention relates to a device for decoding various data superimposed in a vertical blanking period of a video signal.

2. Description of the Related Art

In the latest technology, there is known a method of transmitting various data such as character multiplex signal, caption signal, teletext signal and so forth by utilizing a vertical blanking period of a video signal.

In the format of such data, as shown in FIG. 9(a) for example, first a data sampling clock reference signal (hereinafter referred to as clock reference signal) CR is inserted next to a color burst CB at a predetermined horizontal line position in a vertical blanking period, and a data signal DT composed of a predetermined number of bits is inserted successively thereto. In another example of FIG. 9(b), a reference pulse RP representing the content of the data is inserted next to a color burst CB, and a data signal DT composed of a predetermined number of bits is inserted successively thereto.

The kinds of data to be superimposed and the systems thereof are listed in Table below. Here, a superimpose line signifies a line position (horizontal position) designated in a vertical blanking period. In this table, there are shown merely examples of data contents.

TABLE 1

| Area | Data | Super-impose line | Sampling clock | Examples of data contents |
|---|---|---|---|---|
| Japan | Character multiplex broadcast | 14, 15, 16, 21, 277, 278, 279, 284 | 5.7272 MHz | RGB superimpose |
|  | Video ID | 20, 283 | Fsc/8 | Aspect ratio data, picture display mode data, etc. |
| USA | Closed caption | 21 | 503 kHz | Character broadcast data for deaf and dumb (Character superimpose) |
|  | Line 21; Field 2 | 284 | 503 kHz | Closed caption, text service, etc. |
| Europe | Teletext | 7–22 | 6.9 MHz | RGB superimpose |
|  | VPS | 16 (7–22) | 6.9 MHz | Video apparatus control data such as program code data |
|  | Video ID | Undecided | Fsc/8 | Aspect ratio data, picture display mode data, etc. |

In accordance with such various kinds of the data shown above, a television receiver or video apparatus is equipped with a data decoding device which is capable of decoding such data from the video signal.

A conventional closed caption decoder is shown in FIG. 10 as an exemplary device known in the related art, and waveforms of signals denoted therein by reference numerals (1) through (7) are shown in FIG. 11.

An input video signal (1) from a terminal 1 is supplied to both a low-pass filter 2 and a sync separator 3. The output (2 MHz) of the low-pass filter 2 is compared, in a binary circuit 4, with a predetermined slice level SL as shown in FIG. 11(a), and a binary signal (2) of FIG. 11(b) obtained therefrom is supplied to a gate circuit 5.

Meanwhile a horizontal sync signal Hs and a vertical sync signal Vs are output from the sync separator 3 and then are supplied to a line counter 6. The line counter 6 is reset by the vertical sync signal Vs and then counts the line position by counting the pulses of the horizontal sync signal Hs. The counted value is supplied to a line decoder 7, which then detects the arrival of the value at the 21st line where the caption data is superimposed. The line decoder 7 delivers to the gate circuit 5 a line signal extract pulse (3) which serves as a 21st line gate as shown in FIG. 11(c).

The horizontal sync signal Hs is supplied also to an intraline counter/decoder 8, which then counts output clock pulses CLK of the PLL circuit 11 on the basis of the horizontal sync signal Hs and generates a reference signal extract pulse (4) (FIG. 11(d)) to serve as a gate pulse corresponding to the duration of the clock reference signal CR for the caption signal in the line. The pulse (4) is supplied to a gate circuit 9. The counter/decoder 8 further counts the output clock pulses CLK of the PLL circuit 11 on the basis of the horizontal sync signal Hs and generates a data signal extract pulse (5) (FIG. 11(e)) to serve as a gate pulse corresponding to the duration of the data signal DT for the caption signal in the line. The pulse 5 is supplied to a gate circuit 10.

The 21st-line signal of the binary signal (2) is delivered from the gate circuit 5 in response to the data signal extract pulse (3) and then is supplied to both a register 12 and the gate circuit 9. Since the reference signal extract pulse (4) is also supplied to the gate circuit 9, a 21st-line clock reference signal (6) (FIG. 11(f)) is output from the gate circuit 9 and then is supplied to the PLL circuit 11. The oscillation frequency of the PLL circuit 11 is set fixedly to 503 kHz in conformity with the closed caption signal, so that clock pulses of 503 kHz synchronized with the clock frequency signal (6) are output from the PLL circuit 11 and are supplied to the gate circuit 10. Since the data signal extract pulse (5) is also supplied to the gate circuit 10, the output of the PLL circuit 11 is delivered from the gate circuit 10 for the duration of the pulse (5) and then is supplied as a data extract clock signals (7) (FIG. 11(g)) to the register 12.

Subsequently the data supplied from the gate circuit 5 is sampled in response to the data extract clock signal (7) and is stored in the register 12, whereby the caption data signal is obtained.

And in an apparatus such as a television receiver or the like equipped with the caption decoder mentioned above, a required process relative to the caption information can be executed on the basis of the data thus stored in the register 12.

However, the above caption decoder performs its operation merely with respect to the caption signal alone. Therefore, in any apparatus equipped with the caption decoder, it is necessary to incorporate an exclusive data decoding device therein individually for selectively changing the aspect ratio in accordance with the aspect ratio information or for receiving character multiplex broadcast.

For example, a Japanese television receiver is required to incorporate a character multiplex broadcast decoder and a video ID decoder, whereas an European television receiver is required to incorporate a teletext decoder, a VSP decoder and a video ID decoder.

Furthermore, due to the differences among the data formats used in the individual areas, it is necessary to manufacture different apparatus suited for the individual areas with another disadvantage that some difficulties are unavoidable in standardizing the circuit substrates and so forth employed in the data decoding devices.

Consequently, in view of the above circumstances relative to the television receiver, video apparatus and adapter type data decoding device, there exist problems including a rise of the production cost and an increase of the circuit scale.

SUMMARY OF THE INVENTION

It is therefore an object of the present invention to provide an improved data decoding device which is capable of selectively or simultaneously decoding data of plural formats superimposed on a video signal.

According to one aspect of the present invention, there is provided a data decoding device which decodes data superimposed at a predetermined position in a vertical blanking period of a video signal. The device comprises extract pulse generator means for generating a line signal extract pulse, a data signal extract pulse and a reference signal extract pulse by detecting the line number in the vertical blanking period and the intraline position from a vertical sync signal and a horizontal sync signal; binary circuit means for converting the video signal into a binary signal; PLL circuit means for producing a data extract clock signal in synchronism with the clock reference signal extracted from the video signal in response to the line signal extract pulse and the reference signal extract pulse; memory means supplied with the data extract clock signal and the binary signal in response to the line signal extract pulse and the data signal extract pulse respectively and storing the data signal therein from the binary signal in accordance with the data extract clock signal; and control means for designating the respective durations of the line signal extract pulse, the data signal extract pulse and the reference signal extract pulse generated in the extract pulse generator means, and further designating the frequency division ratios in the PLL circuit means. The device is so constituted as to be capable of decoding data of plural formats selectively or simultaneously.

According to another aspect of the present invention, there is provided an improved data decoding device which comprises extract pulse generator means for generating a line signal extract pulse and a data signal extract pulse by detecting the line number in the vertical blanking period and the intraline position from a vertical sync signal and a horizontal sync signal; binary circuit means for converting the video signal into a binary signal; data sampling clock generator means for generating a sampling clock signal of a frequency higher at least twice than any frequency of the clock signals for the data of plural formats; memory means supplied with the data sampling clock signal and the binary signal in response to the line signal extract pulse and the data signal extract pulse respectively and storing the data signal therein from the binary signal in accordance with the data sampling clock signal; and calculator means for detecting the kind of the data from the pulse duration information relative to the line signal extract pulse in the extract pulse generator means and also from the signal format of the data stored in the memory means. The device is so constituted as to be capable of decoding data of plural formats selectively or simultaneously.

The clock signal frequency and/or the line position to be extracted is variable in conformity with each of the data formats, so that it is possible in the data decoding device to read out any desired data selectively or the data of plural kinds simultaneously. Furthermore, the frequency of the data sampling clock signal is set to be sufficiently higher than that of the data clock signal, so that in the device where the entire superimposed data are extracted and the line positions thereof are detected, it is possible to selectively obtain any desired data from the video signal or to simultaneously obtain the data of plural kinds therefrom.

Thus, due to the improved constitution mentioned, the device is capable of performing a proper decoding operation in compliance with a plurality of systems.

The above and other features and advantages of the present invention will become apparent from the following description which will be given with reference to the illustrative accompanying drawings.

BRIEF DESCRIPTION OF THE DRAWINGS

FIGS. 3(a)–3(g) are waveform charts of signals for explaining the operation of the first embodiment;

FIGS. 4(a)–4(g) waveform charts of signals for explaining the operation of the first embodiment;

FIG. 5 is a block diagram of a data decoding device in a second embodiment of the invention;

FIGS. 6(a)–6(g) are waveform charts of signals for explaining the operation of the second embodiment;

FIGS. 7(a) and 7(b) are flow charts for explaining the operation of the second embodiment;

FIGS. 11(a)–11(g) are waveform charts of signals for explaining the operation of the conventional data decoding device shown in FIG. 10.

DESCRIPTION OF TEE PREFERRED EMBODIMENTS

Figure 1:
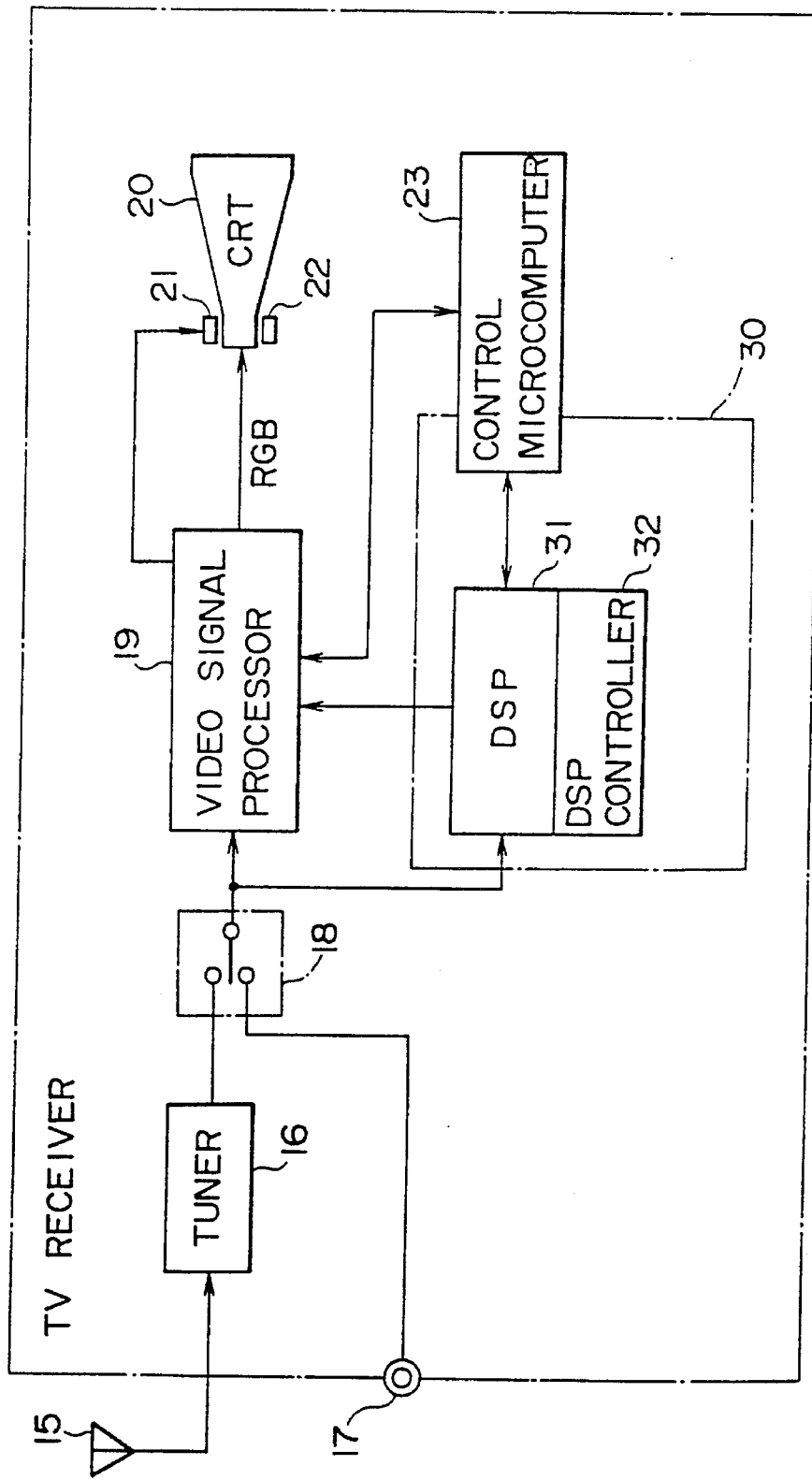
FIG. 1 is a block diagram showing the constitution of an apparatus where a data decoding device of the present invention is incorporated.

Hereinafter the data decoding device of the present invention will be described in detail with reference to preferred embodiments thereof. FIG. 1 shows the entire constitution of a television receiver where the data decoding device of the invention is incorporated. In this diagram, a composite video signal received at an antenna 15 and taken out as an intermediate frequency signal after being passed through a tuner 16, or a composite video signal delivered from a line input terminal 17, is supplied via an input switch 18 to a video signal processor 19.

The video signal processor 19 executes separation of the input video signal into a luminance signal and a color difference signal, and processes such luminance signal and color difference signal, thereby demodulating the input signal to R, G and B signals. Then such signals are supplied to a CRT 20, from which a video output is obtained. The video signal processor 19 further extracts a horizontal sync signal and a vertical sync signal to produce a deflection current and supplies the same to a deflection coil 21.

Denoted by reference numeral 23 is a microcomputer for controlling the operations of the individual circuits in the television receiver.

The data decoding device of the present invention is denoted by reference numeral 30 enclosed with a one-dot chained line, wherein a data signal superimposed in a vertical blanking period is extracted from the composite video signal supplied thereto, and character multiplex data or the like is superimposed on the video signal to be outputted, or mode data or the like is supplied to the microcomputer 23 so as to be used for each control. The data decoding device is constituted by a digital signal processor (DSP) 31, a DSP controller 32 and, in some cases, a portion of software of the microcomputer.

Figure 2:
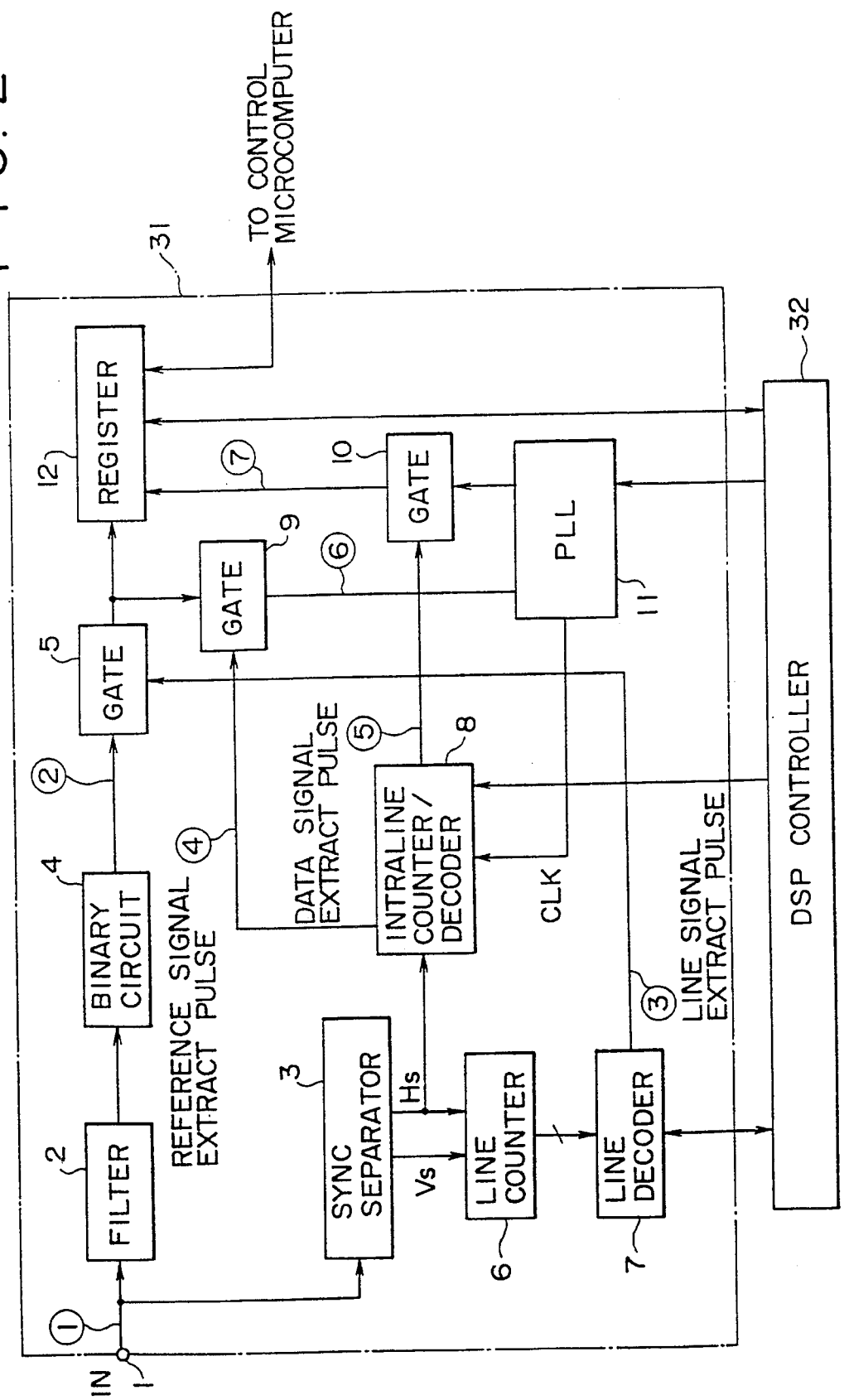
FIG. 2 is a block diagram of a data decoding device in a first embodiment of the invention.

A first embodiment representing the data decoding device of the present invention to be incorporated in an apparatus such as a television receiver will now be described below with reference to FIGS. 2 through 5. FIG. 2 is a conceptional block diagram where the DSP 31 and the DSP controller 32 are used as the data decoding device. A similar constitution is also employed when realizing the data decoding device by the use of a hard logic circuit and so forth in place of the DSP.

FIGS. 3 and 4 show the waveforms of signals (1) to (7) reproduced in the device of FIG. 2.

Figure 10:
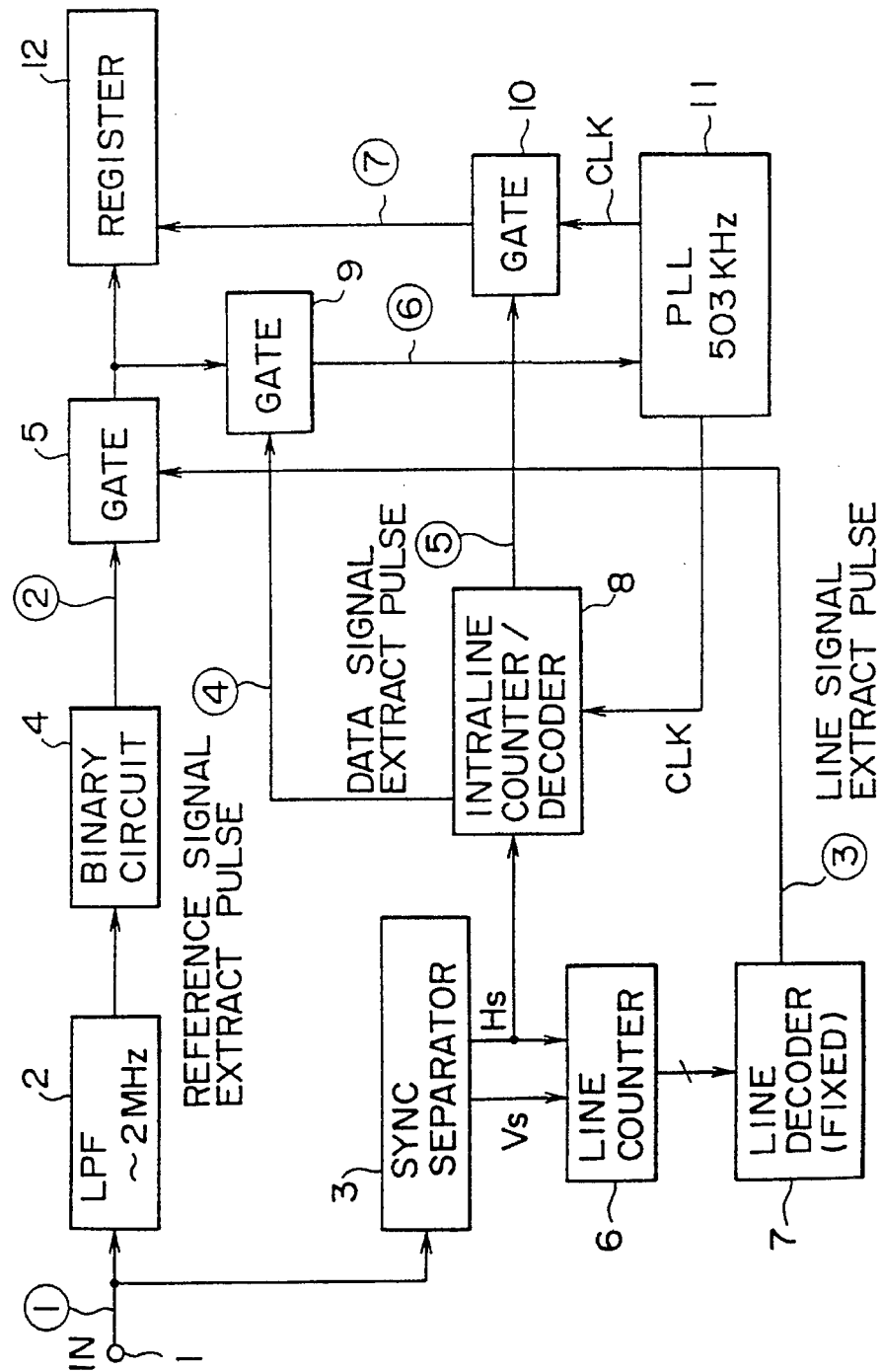
FIG. 10 is a block diagram of a conventional data decoding device in the related art.

Any component elements equal in fundamental operation to those employed in FIG. 10 are denoted by the same reference numerals, and a duplicate description is omitted. In this embodiment, however, the line decoder 7 is so contrived that the DSP controller 32 can designate the line from which the line signal extract pulse (3) is to be outputted. More specifically, the output operation of the line decoder 7 is controlled on the basis of a parameter supplied from the DSP controller 32. And the current line position counted by the line counter 6 is supplied via the line decoder 7 to the DSP controller 32.

Similarly with regard to the intraline counter/decoder 8 also, the output timing of a reference signal extract pulse (4) and that of a data signal extract pulse (5) are variably controlled on the basis of parameters supplied from the DSP controller 32.

The oscillation frequency of the PLL circuit 11 is not fixed, and a parameter is supplied from the DSP controller 32 for setting the frequency division ratio, so that the oscillation frequency is variably controlled.

Figure 9A:
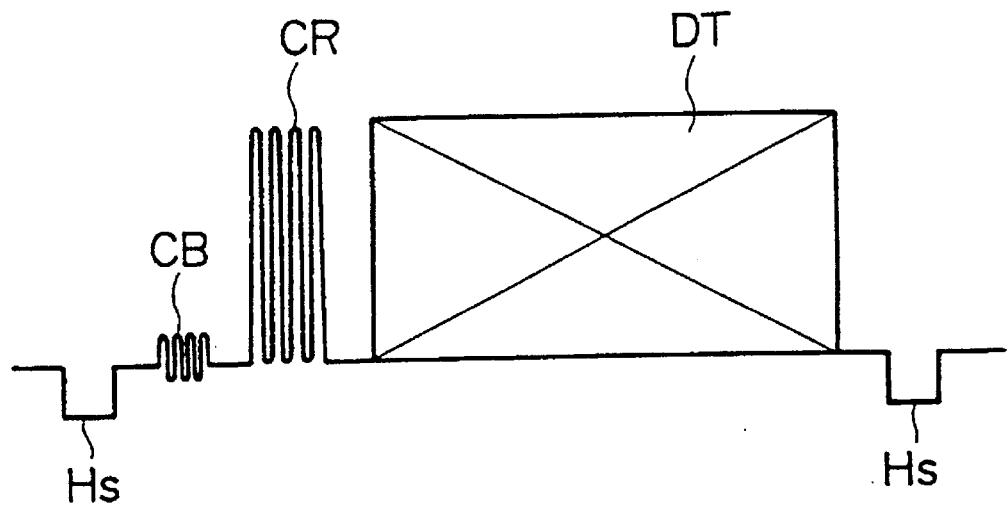
FIG. 9(a) and (b) show signals superimposed in a vertical blanking period.
Figure 9B:
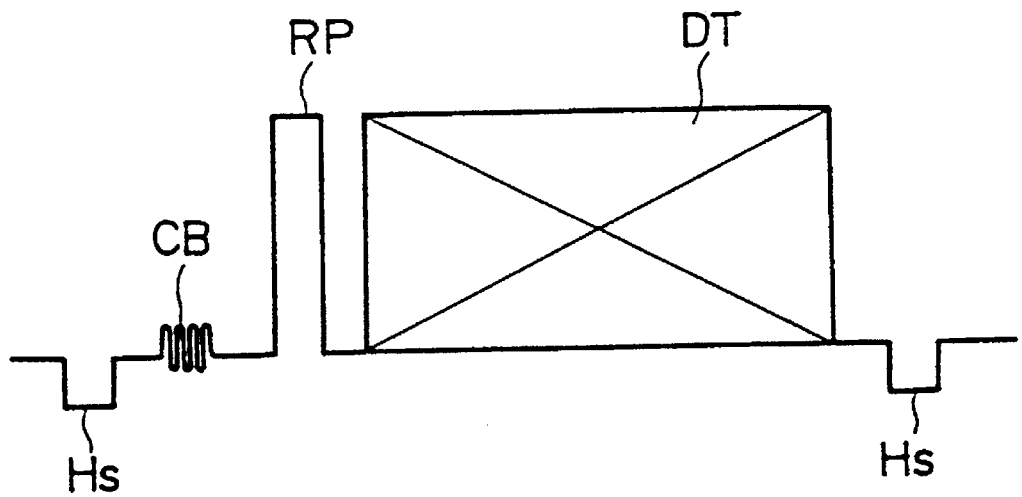

The DSP controller 32 delivers predetermined parameters to the component circuits in accordance with the data signal to be extracted. The intraline positions of the data superimposed in the vertical blanking period are previously known (designated in the format) including, as listed in Table 1, superimpose line position, data sampling clock frequency, reference signal (clock reference signal CR or reference pulse RP in FIG. 9), and data signal DT. Therefore the parameters corresponding to the individual data can be outputted properly.

Now the data decoding operation performable in the constitution of FIG. 2 will be described below with reference to two examples shown in FIGS. 3 and 4.

FIG. 3 shows the operation in an exemplary case where the kind of the data to be extracted is designated in advance and there is a requisite to save the capacity of the register 12.

It is assumed here that, as shown in FIG. 3(a), data of mutually different kinds are superimposed on the 16th, 19th, 20th and 21st lines of the video signals (1) supplied. In this exemplary case, the data decoding device of this embodiment is capable of performing a proper decoding operation with regard to any of such data. Here a description will be given on one case of extracting the data from the 16th line and another case of extracting the data from the 21st line. The data on the 16th and 21st lines are supposed to be in the format of FIG. 9(a) where a clock reference signal CR is added to each of the data.

[Decoding 16th-line data]

The DSP controller 32 sets "16" as a decoding value in the line decoder 7, so that a line signal extract pulse (2) for designating the 16th line is outputted as denoted by a solid line in FIG. 3(b). The intraline counter/decoder 8 is controlled in accordance with the format of the 16th-line data, and a reference signal extract pulse (4) corresponding to the duration $T_{C1}$ of the clock reference signal CR is outputted as denoted by a solid line in FIG. 3(d). Similarly a data signal extract pulse (5) corresponding to the duration $T_{D1}$ of the data signal DT is outputted as denoted by a solid line in FIG. 3(e).

Further a desired frequency division ratio is set in the PLL circuit 11 for causing oscillation approximately equal to the 16th-line data sampling clock signal. For example, in case the VSP data is superimposed on the 16th line as shown in Table 1, the oscillation frequency of the PLL circuit 11 is set approximately to 6.9 MHz.

Due to such control, the 16th-line data is extracted by the gate circuit 5, and the 16th-line clock reference signal CR (signal (6) denoted by a solid line in FIG. 3(f)) is extracted by the gate circuit 9 and then is supplied to the PLL circuit 11. Therefore a clock signal synchronized with the clock reference signal CR is produced from the PLL circuit 11 as a data extract clock signal (7) denoted by a solid line in FIG. 3(g), and such signal is supplied via the gate circuit 10 to the register 12. Consequently, the 16th-line data signal DT in the binary signal (2) is stored in the register 12. This data signal is supplied to, e.g., the microcomputer 23 so as to be used for execution of a predetermined process.

[Decoding 21st-line data]

The DSP controller 32 sets "21" as a decoding Value in the line decoder 7, so that a line signal extract pulse (2) for designating the 21st line is out-putted as denoted by a dotted line in FIG. 3(b). The interline counter/decoder 8 is controlled in accordance with the format of the 21st-line data, and a reference signal extract pulse (4) corresponding to the duration $T_{C2}$ of the clock reference signal CR and a data signal extract pulse 5 corresponding to the duration $T_{D2}$ of the data signal DT are outputted as denoted by dotted lines in FIGS. 3(d) and 3(e) respectively.

Further a desired frequency division ratio is set in the PLL circuit 11 for causing oscillation approximately equal to the 21st-line data sampling clock signal. For example, in case the closed caption data shown in Table 1 is superimposed on the 21st line, the oscillation frequency of the PLL circuit 11 is set approximately to 503 kHz.

Due to the control mentioned above, the 21st-line data is extracted by the gate circuit 5, and the 21st-line clock reference signal CR (signal (6) denoted by a dotted line in FIG. 3(f) is extracted by the gate circuit 9 and then is supplied to the PLL circuit 11. Therefore a clock signal synchronized with the clock reference signal CR is produced from the PLL circuit 11 as a data extract clock signal (7) denoted by a dotted line in FIG. 3(g), and such signal is supplied via the gate circuit 10 to the register 12. Consequently, the 21st-line data signal DT in the binary signal (2) is stored in the register 12. This data signal is supplied to, e.g., the microcomputer 23 so as to be used for execution of a predetermined process. In another case, the data signal DT is processed as character information and is supplied to the video signal processor so as to be superimposed on the video signal.

As described above with regard to the two examples, a data decoding device adapted for various kinds of data can be realized by setting, in accordance with desired data, the line number, the intraline position of the reference signal, the intraline position of the data signal, and the PLL frequency division ratio corresponding to the sampling frequency.

FIG. 4 shows another exemplary operation performable in the constitution of FIG. 2, wherein plural kinds of data to be extracted are designated in advance and such data are extracted simultaneously.

It is assumed in this example that data of mutually different kinds are superimposed on the 16th, 19th, 20th and 21st lines as shown in FIG. 4(a), and the entire data on the 16th, 20th and 21st lines are to be extracted. The data on the 16th and 21st lines are supposed to be in the format of FIG. 9(a) where a clock reference signal CR is added to each of such data, and the data on the 20th line is supposed to be in the format of FIG. 9(b) where a reference pulse RP is added thereto (i.e., the data extractable without the necessity of clock synchronization by the PLL circuit).

Since the decoding value in the line counter 6 is inputted from the line decoder 7, the current line position can be detected by the DSP controller 32. Then the DSP controller 32 sets the intraline position of the reference signal (CR or RP) and that of the data signal DT per line in accordance with the current line position, and controls the output of the intraline counter/decoder 8. For example, a pulse corresponding to the duration $T_{C1}$ of the 16th-line clock reference signal CR and a pulse corresponding to the duration $T_{C2}$ of the 21st-line clock reference signal CR are generated as reference signal extract pulses (4). Further a pulse corresponding to the duration $T_{D1}$ of the 16th-line data signal DT, a pulse corresponding to the duration $T_{D2}$ of the 21st-line data DT, and a pulse corresponding to the duration $T_{D3}$ of the 20th-line data signal DT, are generated as data signal extract pulses (5). None of reference signal extract pulses is generated with regard to the 20th line because there is no necessity of clock synchronization for extraction of the 20th-line data.

For the line decoder 7, the DSP controller 32 generates line extract pulses (3) relative to the 16th, 20th and 21st lines as shown in FIG. 4(c).

Further for the PLL circuit 11, the DSP controller 32 controls the frequency division ratio with respect to the 16th line to obtain an adequate oscillation frequency approximate to the 16th-line data sampling frequency, or sets a predetermined frequency in a fixed oscillator with respect to the 20th line, or controls the frequency division ratio with respect to the 21st line to obtain an adequate oscillation frequency approximate to the 21th-line data sampling frequency.

Therefore, the data extract clock signals (7) outputted from the PLL circuit 11 via the gate circuit 10 is, as shown in FIG. 4(g), a clock pulse locked to the 16th-line clock reference signal CR for the 16th line, or a clock pulse of a predetermined fixed frequency for the 20th line, or a clock pulse locked to the 21st-line clock reference signal CR for the 21st line. Since such clock pulses are supplied to the register 12, the data of the 16th, 20th and 21st lines are stored sequentially in the register 12.

For example, the 16th-line data stored in the register 12 is transferred to a RAM (not shown) in the DSP controller 32 or the DSP 31 or to a RAM in the microcomputer 23 and is held therein together with the line number 16. Similarly, the 20th-line and 21st-line data are also held with the line numbers.

Therefore, the extracted data to be processed can be read out from the RAM in accordance with the respective line numbers.

Thus, the data decoding device is capable of decoding multiple kinds of the data simultaneously by performing the operation mentioned above.

Hereinafter a second embodiment representing the data decoding device of the present invention will be described with reference to FIGS. 5 through 7.

FIG. 5 shows a partial constitution of the DSP 31 (and the DSP controller 32) and the microcomputer 23 employed in FIG. 1. And FIG. 6 shows the waveforms of signals obtained at positions (1) (2) (7) (8) and (9) in FIG. 5.

Any component elements equal in fundamental operation to those employed in FIG. 10 or 2 are denoted by the same reference numerals, and a duplicate description thereof is omitted. In the second embodiment, however, a line decoder 7 is constructed as to output a line signal extract pulse (8) in each of the line intervals where data may be superimposed during the vertical blanking period. And the current line position counted by a line counter 6 is supplied via the line decoder 7 to a microcomputer 23.

An intraline counter/decoder 8 is constructed as to produce data signal extract pulses (9) corresponding to the duration of a reference signal (CR or RP) relative to the data superimposed on each line, and also to the duration where a data signal DT is superimposed.

There is provided a sampling clock generator 13 which generates a sampling clock signal of a frequency sufficiently higher than that of the data superimposed in the vertical blanking period (a frequency higher at least twice than the maximum repetition frequency of the data).

As for a binary signal (2) of FIG. 6(b) outputted from a gate circuit 5 in response to a line signal extract pulse (8) of FIG. 6(c), the sampling clock signal obtained from the sampling clock generator 13 is supplied to a register 12 as a data extract clock signal (7) of FIG. 6(e) via a gate circuit 10 in response to a data signal extract pulse (9) of FIG. 6(d) and then is stored in the register 12.

Thus, in this embodiment, the entire data are stored in the register 12 at a sufficiently high sampling frequency, and thereafter the microcomputer 23 detects the kinds and the contents of the data on the basis of the data in the register 12 and the line information obtained from the line decoder 7, and then executes a predetermined process.

For execution of the process, the microcomputer 23 previously holds the attributes of the data superimposed on each line, such as the frequency of the clock reference signal and the duration of the data DT, and detects the kind of the data by collating such information with the data loaded from the register 12 into the memory incorporated in the microcomputer 23. A routine procedure for the above process is shown in a flow chart of FIG. 7.

When the stored data is loaded from the register 12 upon arrival of the line to be decoded, first a decision is made as to whether the repetitive signal or the clock reference signal CR is existent or not in a predetermined width of the initial portion of the data thus loaded (F101 and F102). In case the result of such decision signifies the existence of the clock reference signal CR, its frequency is detected (F103 and F104). And if the frequency is 503 kHz, the data is regarded as a closed caption signal (F105). Meanwhile if the detected frequency is 5.72 MHz, the data is regarded as a character multiplex signal (F106). In this case, the data loaded during the succeeding period is read as data DT at the relevant frequency interval (503 kHz or 5.72 MHz) (F107).

When the result of checking such data DT by the parity code and the cyclic redundancy code (CRC) is proper (F108), the data DT is recognized to be correct, and a predetermined process is executed by using the data DT (F109).

In case the repetition frequency fails to coincide with the clock reference signal CR of any data format, the data is regarded as one of other kinds not to be decoded or as some other signal (F110).

In case none of the repetitive signal is detected at step F102, a decision is made as to whether the reference pulse RP as video ID is existent or not (F111). And if the result of such decision signifies nonexistence of the repetitive signal or the reference pulse RP either, it is concluded that any data DT to be decoded is not superimposed on the relevant line, and therefore the process is terminated (F112). Meanwhile, if the result of the above decision signifies the existence of the reference pulse RP, it is concluded that some video ID may be superimposed on the relevant line (F113). Then a decision is made as to whether any unrequited high frequency component is existent or not in the duration of the data DT (F114).

If any unrequited high frequency component is detected, the result of the above decision indicates that some noise pulse or the like is erroneously detected as a reference pulse or such component is some other signal. Then it is concluded that any data to be decoded is not superimposed on the relevant line, and therefore the process is terminated (F115).

In case any unrequited frequency component is not existent either, parity code and CRC checks are executed (F108) and, after the data DT is recognized to be correct, a predetermined process is executed on the basis of such data DT (F109).

The data decoding device mentioned is capable of simultaneously decoding plural kinds of data by sampling and extracting the superimposed data at a predetermined sampling frequency and detecting the data contents from the extracted data and the line numbers. In selective decoding of merely desired data alone, a required operation can be performed by changing parameters on the software of the microcomputer 23.

Figure 8:
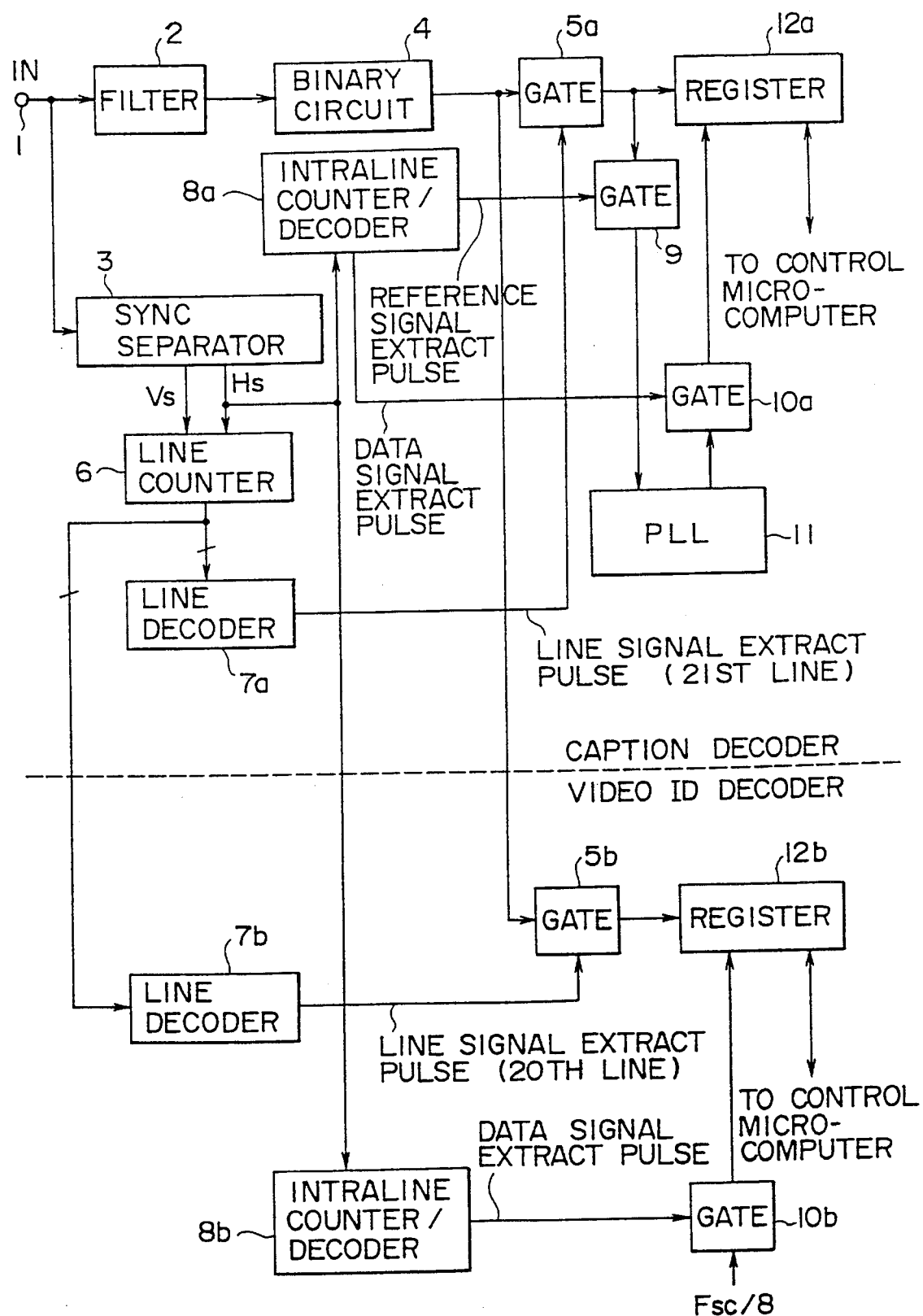
FIG. 8 is a block diagram of a data decoding device in a third embodiment of the invention.

The exemplary constitution of FIG. 8 is another embodiment of the data decoding device for plural kinds of data. This example is adapted for decoding both a caption signal and video ID, wherein a filter 2, a sync separator 3, a binary circuit 4 and a line counter 6 are used in common, while other blocks have exclusive circuits individually.

Particularly in line decoders 7a and 7b, lines relative to generation of line signal extract pulses are fixed to a 21st line for caption signal and a 20th line for video ID, and the output timing of a data signal extract pulse and that of a reference signal extract pulse produced from intraline counters/decoders 8a, 8b are fixed in conformity with individual signal formats respectively.

Consequently, the 21st-line data is supplied from the gate circuit 5a to the register 12a, and a data extract clock signal synchronized with the 21stline clock reference signal CR is supplied also to the register 12a via the gate circuit 10a, so that the caption data DT is stored in the register 12a.

Meanwhile the 20th-line data is supplied from the gate circuit 5b to the register 12b, and a data extract clock signal of a frequency $F_{SC}/8$ (where $F_{SC}$ is the subcarrier frequency) is supplied also to the register 12b via the gate circuit 10b for the duration of the 20th-line data, so that the data DT as video ID is stored in the register 12b.

As described hereinabove with reference to the first and second embodiments, the data decoding device of the present invention is capable of decoding plural kinds of superimposed data. Therefore it is rendered possible to realize great curtailment of the circuit scale and to eliminate the necessity of changing the circuit configuration in the data decoding device in accordance with each destination or sales area of the apparatus where the decoding device is to be incorporated, so that a variety of advantageous effects are achievable including common use and standardization of the component circuits. And a further advantage of wide reduction is attained in the production cost.

What is claimed is:

1. A data decoding device for selectively or simultaneously decoding data of plural formats superimposed at predetermined positions in a vertical blanking period of a video signal, said device comprising:

extract pulse generator means for detecting a line number and an intraline position in the vertical blanking period from a vertical sync signal and a horizontal sync signal of a composite video signal, and generating a line signal extract pulse and a data signal extract pulse;

binary circuit means for converting the video signal into a binary signal;

data sampling clock generator means for generating a data sampling clock signal having a frequency at least twice that of a highest clock signal frequency of the data of plural formats;

memory means supplied with the data sampling clock signal and the binary signal in response to the line signal extract pulse and the data signal extract pulse, and storing a data signal therein from the binary signal in accordance with the data sampling clock signal; and determining means for determining a kind of said data signal from the line number and also from a signal format of said data signal stored in said memory means.

2. The data decoding device according to claim 1, wherein said extract pulse generator means comprises:

sync separator means for separating the video signal into a vertical sync signal and a horizontal sync signal;

first pulse generator means for generating said data signal extract pulse on the basis of the horizontal sync signal; and second pulse generator means for generating said line signal extract pulse on the basis of the vertical and horizontal sync signals.

3. A data decoding apparatus for decoding a plurality of data each super-imposed in one of a plurality of formats in a vertical blanking period of a video signal, said apparatus comprising:

extract pulse generator means for determining a line number and an intraline position in said vertical blanking period from a vertical sync signal and a horizontal sync signal of said video signal and for generating a line signal extract pulse and a data signal extract pulse, said line signal extract pulse corresponding to a horizontal line of said video signal;

binary circuit means for converting said video signal into a binary signal, said binary signal including a binary data signal;

generating means for generating a data sampling clock signal having a frequency at least twice that of a highest clock frequency of said plurality of formats;

memory means, coupled to said binary circuit means and responsive to said data sampling clock signal and to said line signal extract pulse, for storing said binary data signal; and determining means for determining a kind of said binary data signal from said line number and from a signal format of said binary data signal.

4. Apparatus according to claim 3, wherein said signal format of said binary data signal is a frequency of said binary data signal.

5. Apparatus according to claim 3, wherein said determining means also determines said kind by checking said binary data signal for errors.

6. Apparatus according to claim 3, wherein said determining means is a microcomputer.

7. Apparatus according to claim 3, wherein said determining means also determines said kind by checking said binary data signal for a video ID.

* * * * *